United States Patent [19]

Bende

[11] Patent Number: 5,418,642
[45] Date of Patent: May 23, 1995

[54] LIGHT-SHIELDING DEVICE FOR A SCREEN

[75] Inventor: Anthonius F. M. Bende, Amsterdam, Netherlands

[73] Assignee: E.A.G. Herkstroter, Amstelveen, Netherlands

[21] Appl. No.: 183,321

[22] Filed: Jan. 19, 1994

[30] Foreign Application Priority Data

Jan. 20, 1993 [NL] Netherlands .......... 9300110

[51] Int. Cl.[6] .......... G03B 21/56; H04N 5/64
[52] U.S. Cl. .......... 359/450; 348/842; 359/601; 359/612
[58] Field of Search .......... 359/601, 609, 612, 450; 348/842

[56] References Cited

U.S. PATENT DOCUMENTS

| | | | |
|---|---|---|---|
| 1,848,879 | 3/1932 | Halbasch | 88/1 |
| 2,014,322 | 9/1935 | Foulis et al. | 88/1 |
| 2,350,110 | 5/1944 | Hood | 88/1 |
| 2,496,752 | 2/1950 | Rose | 178/7.5 |
| 2,845,835 | 8/1958 | Weiss | 88/1 |

FOREIGN PATENT DOCUMENTS 1255173  1/1961  France .
WO90/06654  6/1990  WIPO .

*Primary Examiner*—Richard A. Wintercorn
*Attorney, Agent, or Firm*—Young & Thompson

[57] ABSTRACT

Collapsible light-shielding device (3) for a displaying screen (2), having a number of annular strips (5', 5) concentrically nested and essentially enclosing one another in a tight manner, which strips are suitable to be fixed in front of a displaying screen and in that case surround the screen. Furthermore, the strips are adapted to slide over one another between a pushed-in position, in which they essentially cover one another, and a pushed-out position, in which they are essentially uncovered. Preferably, the strips (5, 5') have a decreasing wall thickness, viewed in the axial direction.

10 Claims, 3 Drawing Sheets

LIGHT-SHIELDING DEVICE FOR A SCREEN

FIELD OF THE INVENTION

The present invention relates to a collapsible light-shielding device for a screen. With this invention, a wide range of applications is intended, such as television sets, monitors, etc.

BACKGROUND OF THE INVENTION

A known shielding device of this kind is disclosed in U.S. Pat. No. 4,444,465 and consists of an undeformable U-shaped shaft section of flanged plastic plate material. The shaft section is placed upside down over the housing of the screen, i.e. with the legs of the shaft section pointing downwards. Thus, the body of the shaft section rests on the upper side of the housing, while its legs are on either side of the screen. In the extended position, the shaft section projects from the housing beyond the displaying screen and prevents irritating reflections of natural light and/or artificial light on the glass of the screen, thereby rendering the image shown on the displaying screen clearer. The known shielding device is collapsible by pushing it over the housing into a position in which the shielding device does not project beyond the screen.

This known shielding device has several disadvantages. In order to ensure that the shielding device remains balanced in its operating position, a special fastening device is required which consists of a bracket which has to be attached on top of the housing. As a result thereof, a relatively expensive part is required which greatly affects the outward appearance of the housing. Furthermore, the shielding device is bulky under any circumstance, which can be irritating and may also adversely affect the outward appearance of the housing of the screen. In addition, the user is required to sit straight in front of the displaying screen when the shielding device is extended, as the shielding device is too much of a nuisance when viewing the displaying screen at an angle.

SUMMARY OF THE INVENTION

The object of the invention is to provide an improved extendable shielding device. For this purpose, the light-shielding device according to the invention is characterized by a number of annular strips concentrically nested and essentially enclosing one another in a tight manner, which strips are suitable to be fixed in front of a displaying screen and in that case surround the screen, said strips furthermore being suitable to slide over one another between a pushed-in position, in which they essentially cover one another, and a pushed-out position, in which they are essentially uncovered.

Thus, it is possible to fold the light-shielding device around the displaying screen so that it is of very small size. In the folded-in state, the shielding device takes up relatively little space and therefore does not form an obstruction. Furthermore, the light-shielding device according to the invention can easily be fitted to a screen, for example using Velcro.

Especially when the strips of the light-shielding device have a decreasing wall thickness, viewed in the axial direction, it is also possible to place the light-shielding device in various positions relative to the face of the screen, so that the displaying screen can be viewed from different angles without hindrance.

Preferably, the strips of the light-shielding device are provided with hook elements or locking elements to ensure reliable folding-in and folding-out of the light-shielding device. Furthermore, the invention provides an adapter member providing a flat attachment face for the light-shielding device. Thus, by using the adapter member, the light-shielding device, which usually requires a flat attachment face, can be fixed to virtually any type of monitor, with either a flat or a single- or or double-curved front.

The strips can be of solid design, for example produced by injection-moulding, but may also be produced by bending plate material, preferably provided with integrated hook or locking elements.

Thus, the present invention provides a collapsible light-shielding device for a screen, which consists of as few parts as possible, is inexpensive to produce, operates reliably and can easily be fitted to a monitor.

BRIEF DESCRIPTION OF THE DRAWINGS

The invention will be explained in more detail below with reference to an exemplary embodiment which is shown in the attached drawings and does not limit the invention. In these drawings.

DETAILED DESCRIPTION OF THE INVENTION

Figure 1:
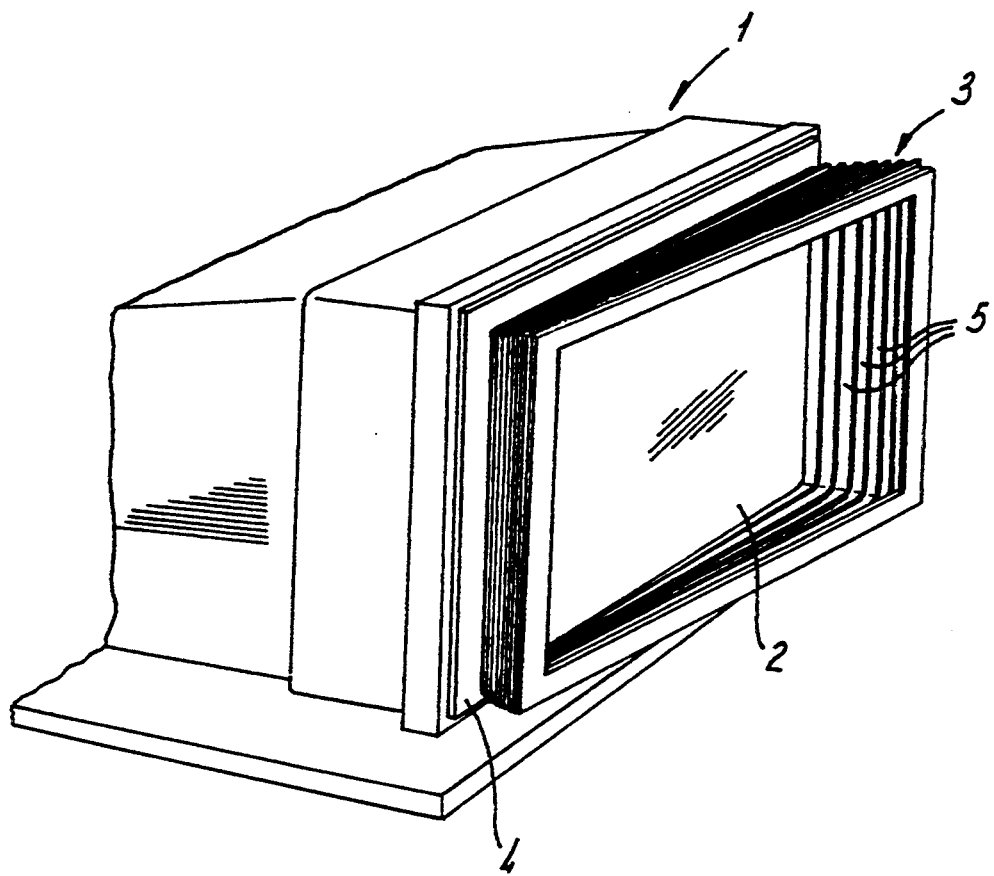
FIG. 1 shows a perspective view of the collapsible light-shielding device according to the present invention, mounted on a monitor which is only shown in part here.

FIG. 1 shows a monitor 1 having a displaying screen 2 around which a light-shielding device 3 according to the present invention has been fitted. As will become more apparent below, said light-shielding device 3 has a flange 4 by means of which it is attached to the monitor 1, as well as a number of, preferably 10, plate-shaped annular strips 5 which are concentrically nested with little play. As illustrated in FIG. 1, the light-shielding device as shown in the drawing is extended less far at the front than at the back, thereby enabling the displaying screen 2 to be viewed at a relatively acute angle. Other positions of the light-shielding device can also be effected, for example a downward or upward angle, if desired in combination with a sideways angle.

Figure 2:
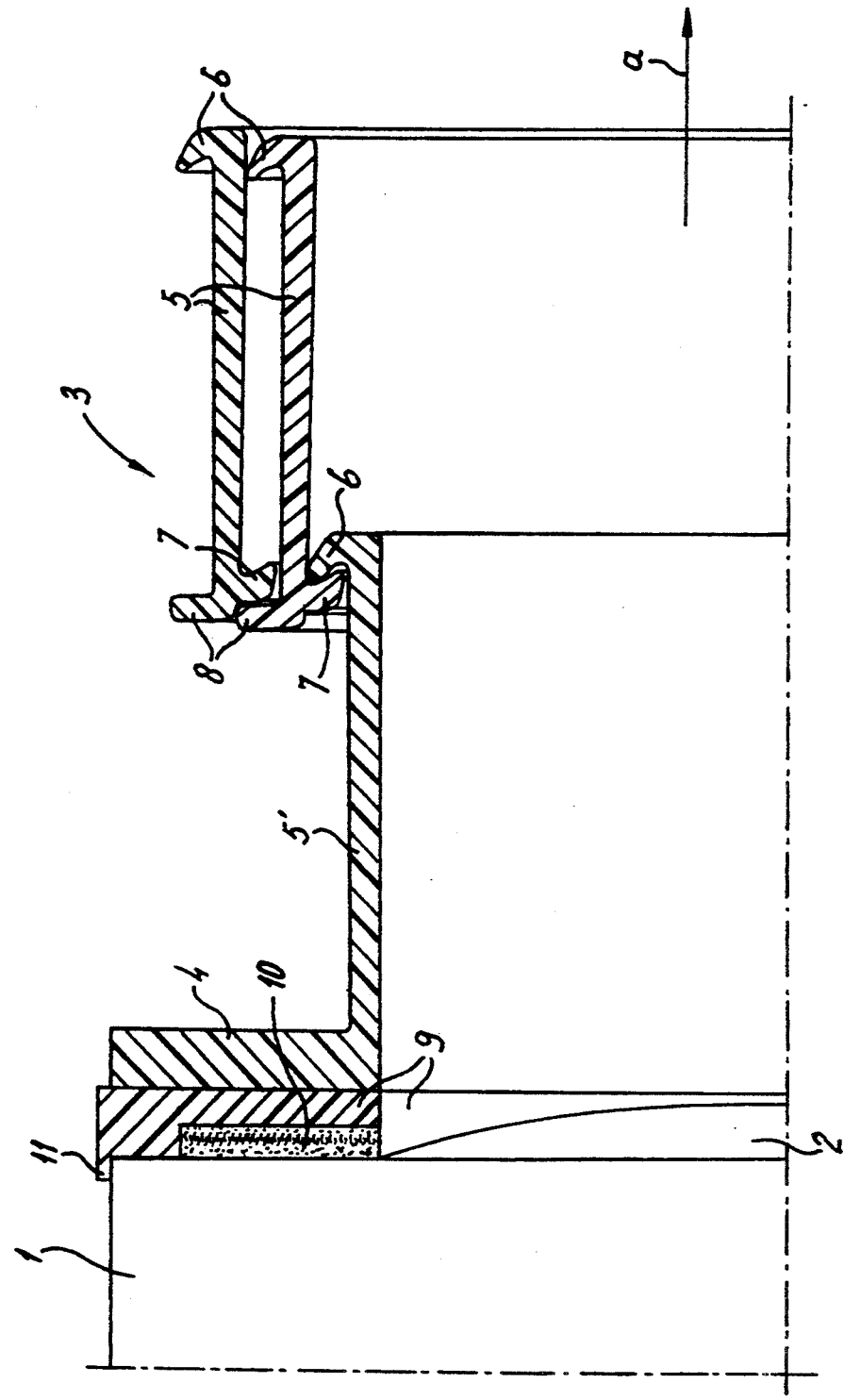
FIG. 2 shows a sectional view of a part of the collapsible light-shielding device of FIG. 1, with the light-shielding device in a partly folded-in position and mounted on a monitor which is only shown in part.

Of the light-shielding device 3, FIG. 2 only shows the innermost strip 5' connected with the monitor 1 and two further strips 5 directly adjacent thereto. At the end facing the monitor 1, the strip 5' has a flange 4 protruding at right angles, and at the other end a hook 6. The further strips 5 have a hook 6 on the one end and a hook 7 at the other end, which hook 7 protrudes from the opposite side. It can clearly be seen that the hook 7 of the further strip 5 interacts with the hook 6 of the strip 5', thereby preventing the further strip 5 from being extended further over the strip 5' in the direction of the arrow a, and the light-shielding device 3 from separating into its component parts. In addition, each further strip 5, of which only two are shown here but of which there are usually nine, has a locking projection 8 at the end near the hook 7, on the side of the hook 6. As can be seen in FIG. 2, such a projection 8 of one further strip 5 interacts with the hook 7 of the other further strip 5, when these further strips 5 are pushed over one another counter to the direction of the arrow a. It is thereby ensured that the other further strips 5 are likewise pushed in, ultimately over the fixed strip 5', when the outermost further strip 5 is being pushed counter to the direction of the arrow a.

Furthermore, FIG. 2 shows how the flange 4 is connected to the monitor 1 with the interposition of an adapter member 9 likewise shown in cross section. The adapter member 9 is essentially plate-shaped and runs in a concentrically annular manner around the displaying screen 2, as do the strip 5' and the further strips 5. On the side facing away from the flange 4, the adapter member 9 has recess 10 which is filled with a felt-like or sponge-like material which can be compressed to a large extent. As can be seen, the recess 10 extends from the radial inner edge of the adapter member. On the radial outer edge, also on the side facing away from the flange 4, the adapter member 9 has an axial projection 11 which grips around the monitor 1. As the adapter member 9 is made of readily elastically deformable material, the projection 11 serves as a kind of apron by means of which the adapter member 9 can be attached to the monitor 1 in an attractive manner, without too large a gap being formed. A convex shape of the front of the monitor can be compensated for by the space 10, which is filled with highly compressible material and by means of which the adapter member 9 provides a flat attachment face for the flange 4. The recess 10 may, for example, not be present on any of the four corners of the adapter member, so that there the adapter member 9 bears against the monitor 1 with its entire surface.

Figure 3:
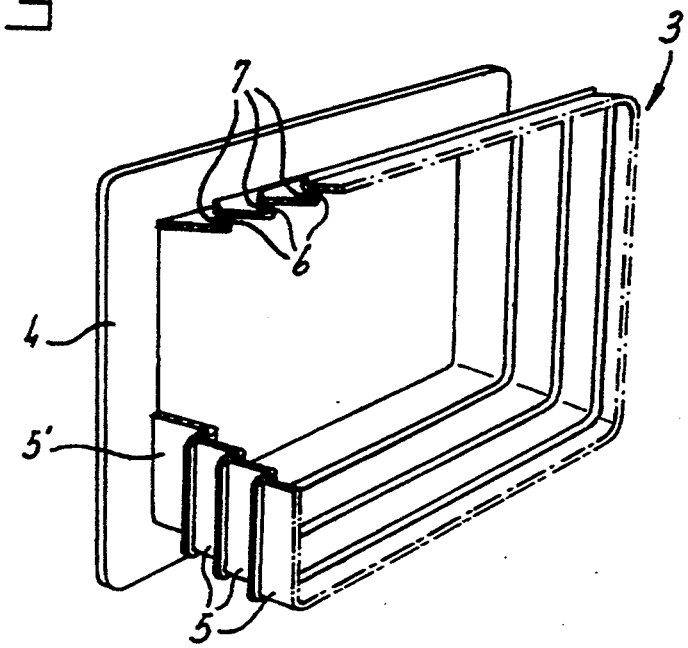
FIG. 3 shows a view according to FIG. 1 of part of the collapsible light-shielding device shown in a different position and without the monitor.

Furthermore, FIG. 3 shows part of the light-shielding device of FIGS. 1 and 2 in a different extended position. It can clearly be seen how the hooks 6 and 7 on the strips 5 and 5' interact. In this case as well, only the fixed strip 5' and the next three further strips 5 have been shown for the sake of clarity.

Figure 4:
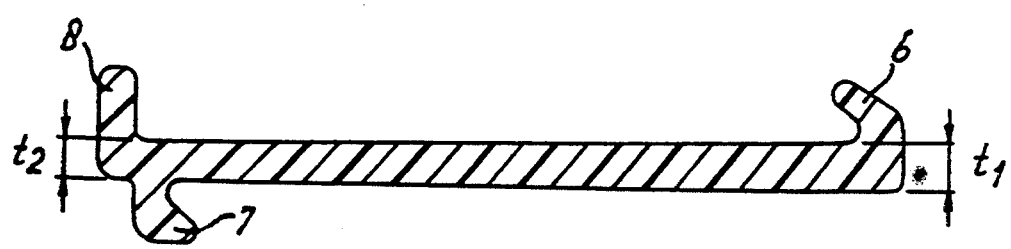
FIG. 4 shows the profile section of an individual solid strip of the light-shielding device according to the present invention.

FIG. 4 shows the profile section of the strips 5. The total length is 16 mm. On the side of the hook 6, the thickness $t_1$ is 1.1 mm; on the side of the hook 7, the thickness $t_2$ is 0.6 mm. The total height of the profile section on the side of the hook 6 is 2.1 mm; on the side of the hook 7, the total height is 3.1 mm.

Thus, the thickness of every strip 5, 5' decreases in the axial direction, the thickness on the side of the hook 6 being greater than that on the side of the hook 7. This means that when a strip 5 is completely extended relative to the adjacent strip 5, the strips 5 enclose one another more tightly compared to the position where the adjacent strips are pushed over one another as far as possible. Thus, on the one hand, a good positive locking is provided for the strips in the position as shown, for example, in FIG. 3, and, on the other hand, sufficient play is provided in positions which are not fully extended in order to effect a slanting position, for example according to FIG. 1.

Figure 5:
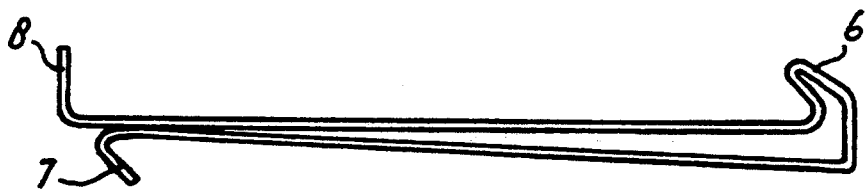
FIG. 5 shows a view according to FIG. 4 of a modification of the strip.

Furthermore, FIG. 5 shows a modification of the profile section shown in FIG. 4. In this case, the modification shown in FIG. 5 is a bent profile section made from plate material with integrated hooks 6 and 7 and projection 8. Using a plate thickness of 0.3 mm, the decrease in thickness can be effected in a way similar to that of the embodiment of FIG. 4.

Figure 6:
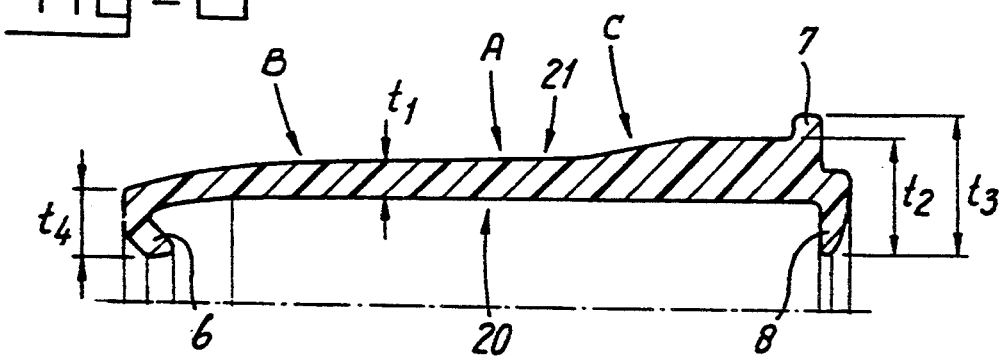
FIG. 6 shows a view according to FIG. 4 of another modification of the strip.

FIG. 6 shows another modification to the profile section of the strips 5. The total length is 21.25 mm. At the indicated position, the thickness $t_1$ is 1.1 mm; on the side of the hook 7, the thickness $t_2$ is 1.9 mm. The total height of the profile section on the side of the hook 6 ($t_4$) is 1.9 mm; on the side of the hook 7 ($t_3$), the total height is 4.1 mm. At hook 7, before the inclined part C, the thickness of the strip is constant. As indicated, the lower face 20 is substantially flat; merely the outer part at hook 6 is somewhat lowered. The upper face 21 is inclined. The greatest inclination is indicated at arrow C. However, at arow A, the inclination still is 2°, while at arrow B the inclination is 5°30'.

Thus, the thickness in the axial direction, the thickness on the side of the hook 7 being greater than that on the side of the hook 6. Apart from the advantages as with the strips of FIGS. 4 and 5, the strip according to FIG. 6 provides improved positioning of the strips with respect to each other since the provision of the part at constant thickness.

Of course, it is possible to conceive modifications of the embodiments described and shown here. The essence of the invention is that the light-shielding device consists of annular strips which are concentrically nested and essentially enclose one another in a tight manner, which strips preferably have a decreasing wall thickness, viewed in the axial direction, so that the light-shielding device can be set to various angular positions relative to the screen, making it possible to view the displaying screen from various angles. The invention is therefore defined in more detail by the appended claims.

I claim:

1. Collapsible light-shielding device (3) for a displaying screen (2), comprising a number of annular strips (5, 5') concentrically nested and essentially enclosing one another in a tight manner, said strips adapted to be fixed in front of a displaying screen of a housing (1) and surround the screen, said strips having in their end regions hook elements (6, 7) for interacting with hook elements on adjacent strips, and wherein a hook element (6) in one end region is located on an opposite side of the strip viewed from a hook element (7) on the other end region, such that said strips can slide over one another between a pushed-in position, in which they essentially cover one another, and a pushed-out position, in which they are essentially uncovered.

2. Light-shielding device according to claim 1, wherein the strips have a decreasing wall thickness, from one end region to the other.

3. Light-shielding device according to claim 2, wherein at least one of the end parts of the strip has a constant thickness.

4. Light-shielding device according to claim 1, wherein each strip has a locking projection (8) on one of the end regions, on the side opposite any relevant hook element present there.

5. Light-shielding device according to claim 1, wherein the innermost strip (5') viewed in the radial direction includes means for fixing it around the displaying screen.

6. Light-shielding device according to claim 5, wherein the innermost strip to be fixed around the displaying screen has a flange (4) protruding essentially at right angles on the side to be turned towards the displaying screen, a concentric, annular plate-shaped adapter member (9) connected with said flange (4) on the side turned towards the displaying screen, said adapter member having a recess (10) running from a radial inner edge thereof and running essentially completely tangentially around the same on the side facing away from the flange, an axially protruding lip (11) on the radial outer edge on that same side for attaching said adapter member to the housing when mounting said adapter member around a displaying screen.

7. Light-shielding device according to claim 6, wherein the adapter member is made from a readily elastically deformable material.

8. Adapter member for a light-shielding device according to claim 6.

9. Strip for a light-shielding device according to claim 1.

10. Light-shielding device according to claim 1, wherein each strip has a bent profile section made from plate material with integrated hook elements and a locking projection.

* * * * *